United States Patent [19]

Malmuth et al.

[11] 4,121,087
[45] Oct. 17, 1978

[54] METHOD AND APPARATUS FOR CONTROLLING LASER WELDING

[75] Inventors: Norman D. Malmuth, Westlake Village, Calif.; George Birnbaum, Rockville, Md.; William F. Iceland, Los Alamitos, Calif.

[73] Assignee: Rockwell International Corporation, El Segundo, Calif.

[21] Appl. No.: 852,896

[22] Filed: Nov. 18, 1977

[51] Int. Cl.² ............................................. B23K 9/00
[52] U.S. Cl. .............................. 219/121 L; 219/130.21
[58] Field of Search ....... 219/130.21, 121 L, 121 LM, 219/121 EB, 121 EW

[56] References Cited

U.S. PATENT DOCUMENTS

| | | | |
|---|---|---|---|
| 3,196,246 | 7/1965 | El-Kareh | 219/121 EB |
| 3,627,972 | 12/1971 | Iceland et al. | 219/130.21 |
| 4,005,308 | 1/1977 | Chaney et al. | 219/130.21 |

Primary Examiner—J. V. Truhe
Assistant Examiner—Fred E. Bell
Attorney, Agent, or Firm—L. Lee Humphries; Craig O. Malin

[57] ABSTRACT

A method and apparatus is provided for laser welding which utilizes the power reflected by the surface being welded to control the power input to the weld. A beam of laser light is projected on the surface to be welded and the power of the light reflected by the surface is measured by a wattmeter placed in the path of the reflected beam. The output from the wattmeter is used to control the laser power per unit area projected on the weld. In one embodiment the wattmeter output is used to control the speed of the skate motor which moves the surface being welded. In another embodiment, the wattmeter output is used to control the output of the laser.

15 Claims, 4 Drawing Figures

METHOD AND APPARATUS FOR CONTROLLING LASER WELDING

BACKGROUND OF THE INVENTION

A. Field of the Invention

This invention relates to the field of welding, and particularly to laser welding.

B. Description of the Prior Art

The development of lasers has prompted attempts to use them for welding metals. Lasers provide a clean source of heat which can be precisely focused to follow a weld joint.

A problem with using lasers for welding is the high reflectivity of many metals. If the metal acts as a mirror and reflects a large portion of the beam of light, then little power will be available for making the weld. This is a particularly serious problem for welding metals such as aluminum which have very high coefficients of reflectivity. As shown in Table 1 below, the reflectivity of aluminum is three to four times as high as the reflectivity of type 321 stainless steel.

TABLE 1

| REFLECTIVITY AT 300° K | | |
|---|---|---|
| Wavelength of light, $\mu m$ | Reflectivity of Aluminum | Reflectivity of 321 stainless steel |
| 2 | .60 | .15 |
| 4 | .75 | .20 |
| 6 | .82 | .22 |
| 8 | .87 | .24 |
| 10 | .89 | .25 |
| 15 | .90 | .25 |

For metals having high reflectivity such as aluminum, it is very difficult to start the weld and to control the heat input into the weld. Consequently, the laser welding of aluminum has not found substantial commercial application.

SUMMARY OF THE INVENTION

It is an object of the invention to provide an improved method and apparatus for controlling the laser welding of metals.

It is an object of the invention to provide a method and apparatus for determining the initiation of melting during the beginning of a laser weld cycle.

It is an object of the invention to provide a method and apparatus for controlling the power per unit area projected by a laser beam during welding.

According to the invention, a method and apparatus is provided for laser welding which utilizes the power reflected by the surface being welded to control the power input to the weld. A beam of laser light is projected on the surface to be welded and the power of the light reflected by the surface is measured by a wattmeter placed in the path of the reflected beam. The output from the wattmeter is used to control the power per unit area projected on the weld. In one embodiment the wattmeter output is used to control the speed of the skate motor which moves the surface being welded. In another embodiment the wattmeter output is used to control the output of the laser.

These and other objects and features of the present invention will be apparent from the following detailed description, taken with reference to the accompanying drawings.

DESCRIPTION OF THE PREFERRED EMBODIMENT

Figure 1:
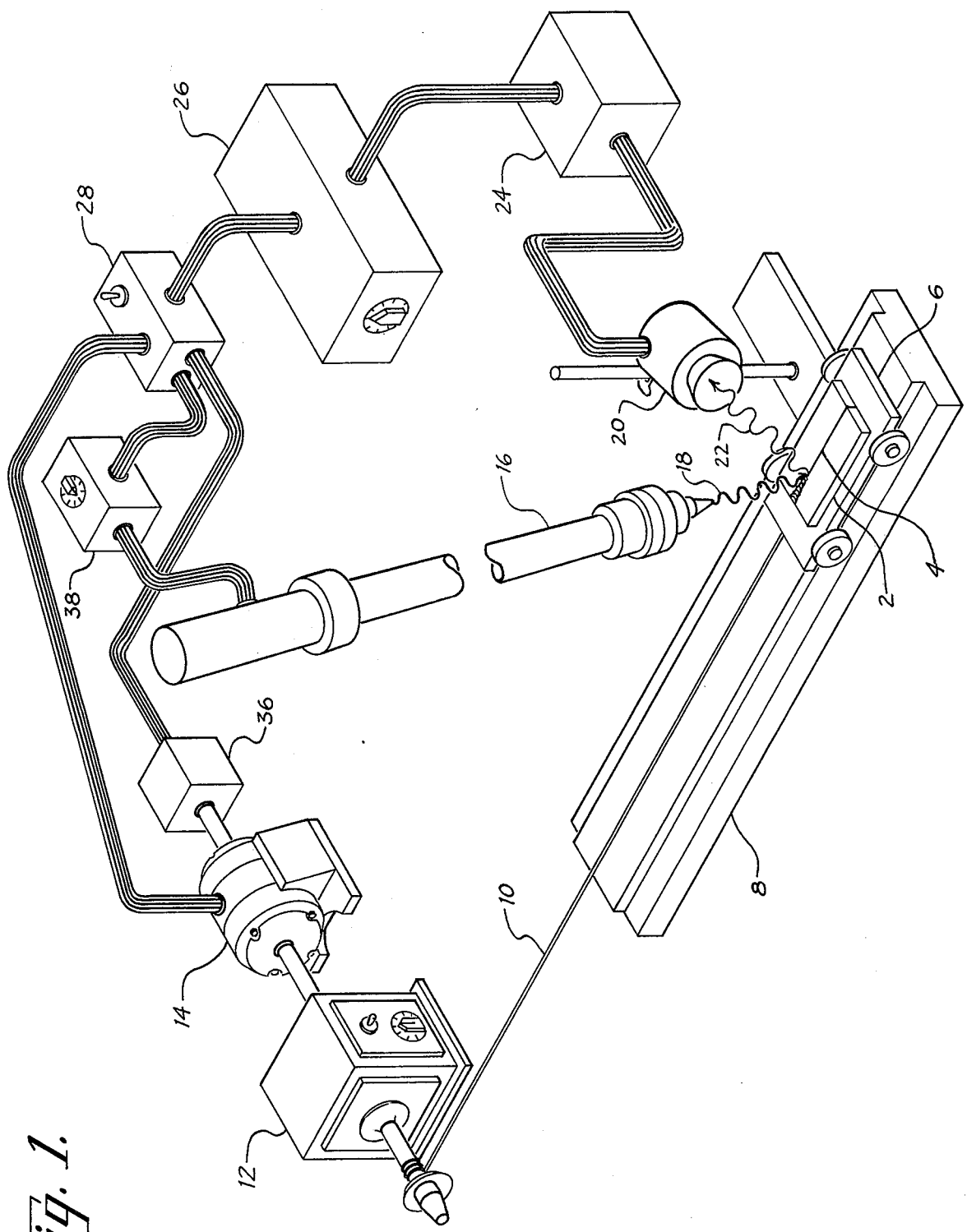
FIG. 1 is a schematic perspective of the apparatus used to illustrate the invention.

FIG. 1 is a schematic perspective of the test set-up used to demonstrate the apparatus and method of the invention. An aluminum weld specimen 2 having a joint 4 to be welded is placed on a moveable carriage 6 which runs on a support track 8. A cable 10 is used to pull carriage 6, although other means of locomotion such as a rack and pinion could be used. Cable 10 is pulled by a gearbox 12 which in turn is driven by a variable speed motor 14.

A laser 16 is positioned so that its incident beam of light radiation 18 strikes weld joint 4. The laser 16 is equipped with internal means for continuously monitoring its power output. The power output can be adjusted either manually or automatically by controlling the current to the laser. Thus, the power output of the laser is known at all times and can be adjusted as required by the weld schedule to compensate for any variations in the laser's performance.

For tests run on a 0.032 inch strip of aluminum, a model 41 Coherent Radiation Labs (CRL) $CO_2$ laser was used having 250 watts of output power. This laser emits light having a wavelength of 10.6 $\mu m$. As shown in Table I, aluminum has a very high reflectivity (0.9) at this wavelength, making it difficult to absorb the energy coming from the laser.

An important feature of the invention is the positioning of a wattmeter pickup 20, or suitable calorimeter, in the path of the reflected laser beam 22 or in the path of a sample of the reflected beam. The wattmeter 20 used with the previously mentioned 250 watt laser was a model CRL 213 thermopile-type wattmeter. A beam splitter or other device can be used to sample the reflected beam 22 when high power is required to weld a joint in order to keep the amount of power striking the wattmeter within its limit. The remaining energy in the reflected beam can be absorbed in a firebrick catcher or other heat sink.

The power received by wattmeter pickup 20 is converted to a signal in wattmeter 24 and amplified in amplifier 26. In a first embodiment of the invention, the amplified signal is used to control the speed of variable speed motor 14 (sometimes called the skate motor). In a second embodiment the signal from amplifier 26 is used to control the power output of laser 16. For purposes of illustration, FIG. 1 shows a two-position switch 28 for practicing both embodiments of the invention.

Figure 2:
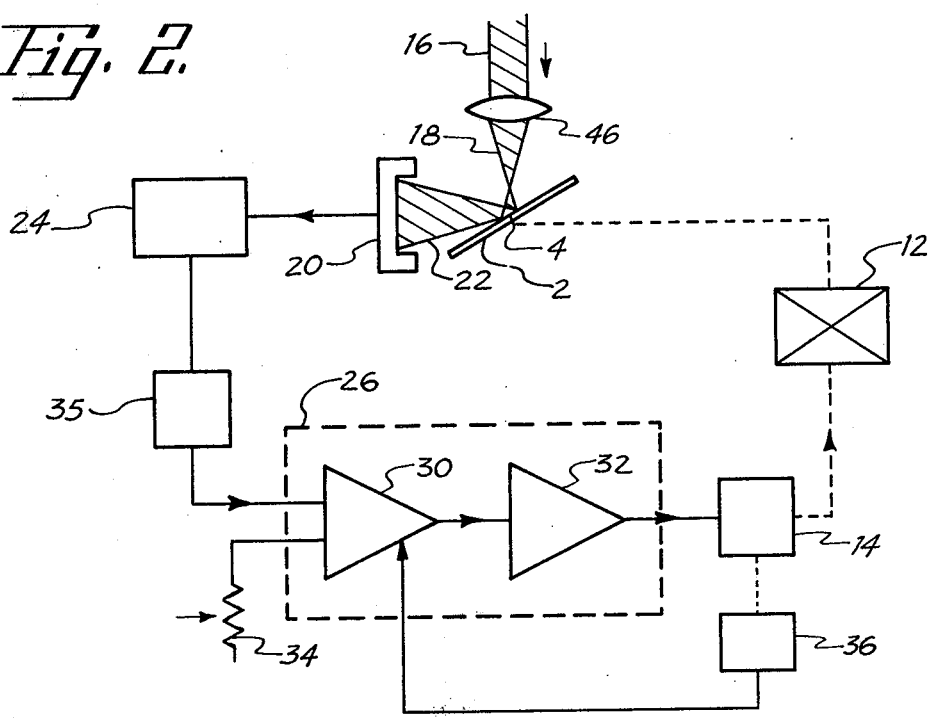
FIG. 2 is a block diagram of a first embodiment of the invention utilizing skate motor control of welding.

FIG. 2 is a block diagram showing the electrical circuit utilized when switch 28 is in position to practice the first embodiment. According to the first embodiment, amplifier 26 comprises a differential amplifier 30 and a power amplifier 32. The output of power amplifier 32 determines the speed of skate motor 14. Three signals are fed into differential amplifier 30 to determine the speed of motor 14. The first signal is a set signal determined by resistor 34. The set signal is based upon the heat input requirements of the particular weld joint and is determined experimentally during establishment of the weld schedule.

The second signal is the output from the wattmeter 24 and is a measure of the power reflected by the weld joint 4. Function generator 35 can be used to modify the wattmeter output to provide suitable response by the laser. The third signal comes from feedback generator 36 and is related to the actual speed of motor 14. Motor 14 moves the weld specimen 2 under the incident laser beam 18. In this manner, the power input per unit area of weld joint can be controlled as a function of reflected power 22.

Figure 3:
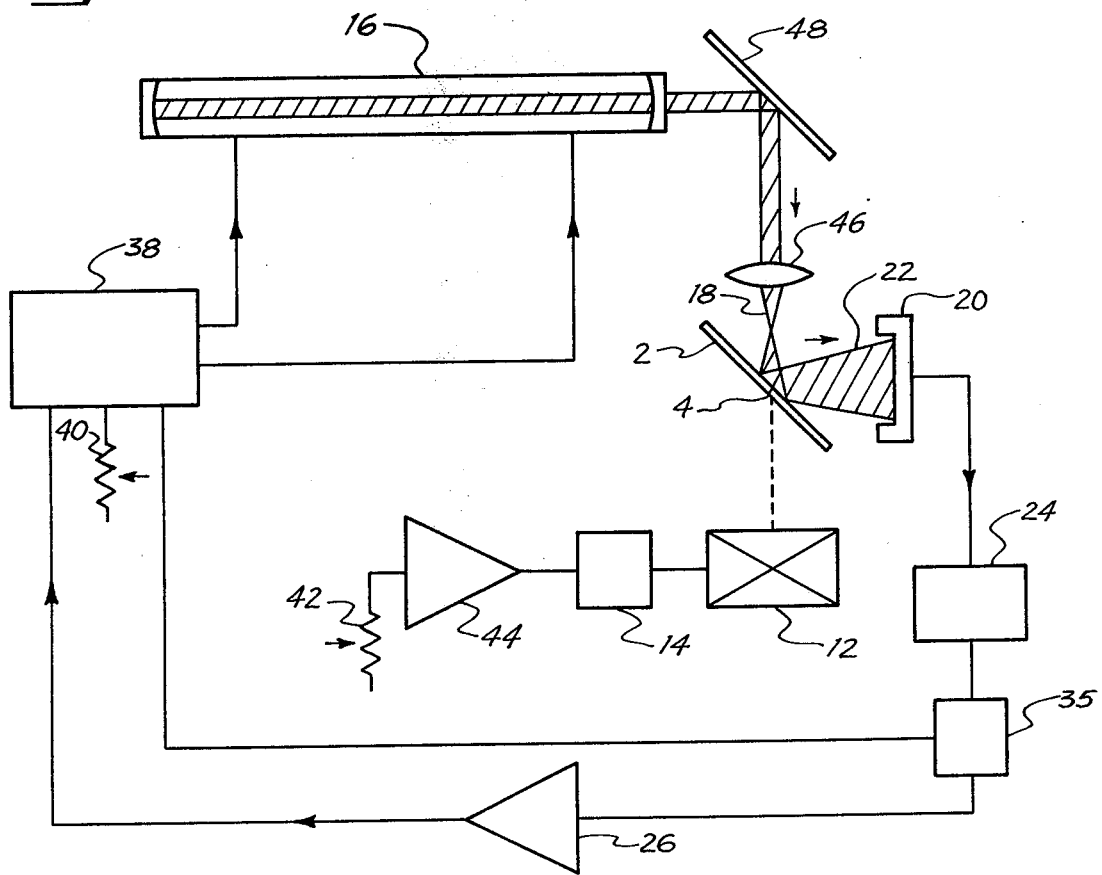
FIG. 3 is a block diagram of a second embodiment of the invention utilizing laser beam power control of welding.

FIG. 3 is a block diagram of a second embodiment of the invention in which the amplified output from wattmeter 24, as modified by function generator 35, is used to control the power output of laser 16 by means of constant current power controller 38. The initial set point of power controller 38 is determined by resistor 40 based upon the heat input requirements of the particular weld joint 4 as experimentally determined during establishment of the weld schedule. In this second embodiment, variable speed motor 14 is set to run at a substantially constant speed once the weld cycle has begun. Like the set point 40 for the laser power controller 38, the set speed for motor 14 is based upon the heat input requirements of the particular weld joint 4. This uniform speed is set by resistor 42 which controls motor amplifier 44.

According to the second embodiment, the total power output of laser 16 is not held constant, but rather is varied as a function of the power reflected by the weld. When the amount of power reflected by the weld increases during the welding cycle, the wattmeter 24 signals the power control 38 to increase the power output of laser 16 to overcome this increased loss of power by reflection. However, to prevent a too rapid increase in laser output and to compensate for fluctuations in the total output of the laser, function generator 35 can modify the signal put out by wattmeter 24. In a preferred embodiment, function generator 35 monitors the total power output of the laser and the reflected power to provide a signal to controller 38 which maintains the difference between the total power output and the reflected power substantially constant. This will, of course, tend to keep the power absorbed by the weld joint constant.

Although not shown in FIG. 3, a signal from wattmeter 24 can be used to start motor 14 in a known manner and at a time determined by wattmeter 24, as discussed later with regard to the curve in FIG. 4.

FIGS. 2 and 3 also show a lens 46 for focusing, or defocusing the incident beam 18. As shown in these figures, beam 18 is defocussed somewhat to spread the beam across the weld joint 4. FIG. 3 also shows a 45° mirror 48 for deflecting the laser beam.

Figure 4:
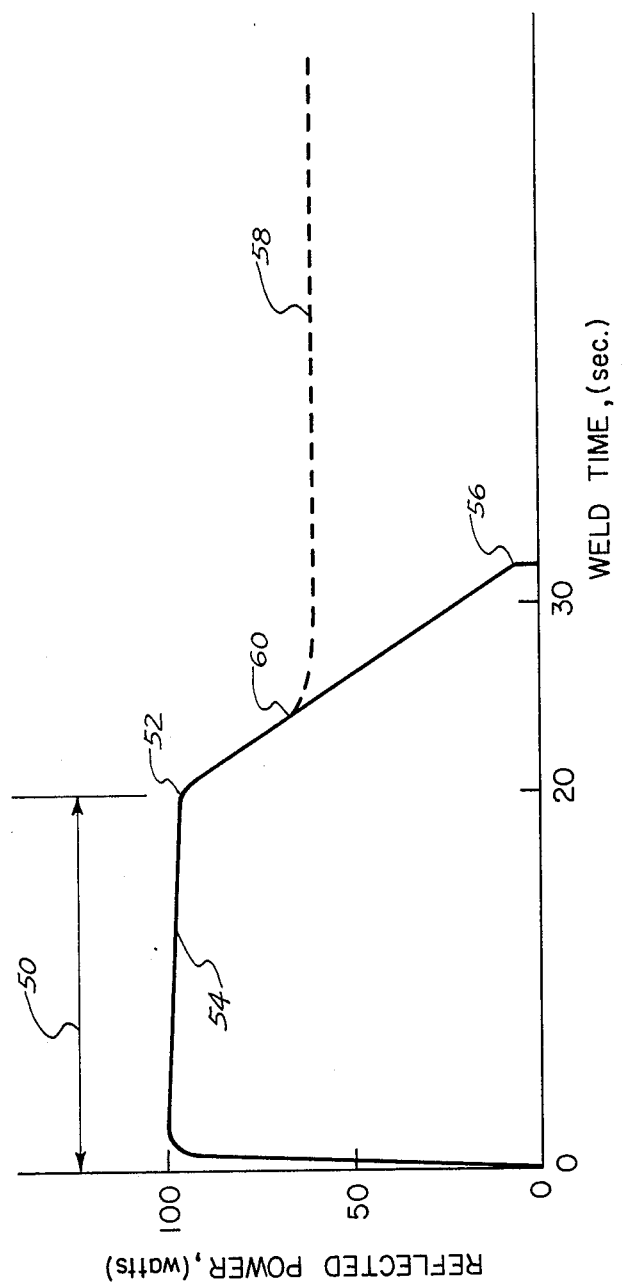
FIG. 4 is a curve showing the relation between reflected power and welding time.

FIG. 4 is a typical graph of the reflected power 22 as a function of weld time for welding a 0.032 inch thick aluminum specimen according to the method of the invention. At time equal zero, a laser beam of sufficient power, for example 170 watts for the 0.032 inch thick specimen, is focussed on the weld joint. As shown in FIG. 4, the reflected power measured by wattmeter 24 is relatively flat for a heat-up period 50. The length of heat-up period 50 depends upon many factors such as the power of the incident laser beam, the surface color and roughness, the temperature of the welded joint, and the particular metal and weld joint design. However, the end of the heat-up period is clearly shown by the wattmeter as a sharp knee 52 in the curve 54 when melting begins. The reflected power then decreases quite rapidly until the beam melts a hole through the weld specimen as shown by the abrupt change to zero reflected power at location 56.

The precise cause of knee 52 and the rapid decrease in reflected power after this knee depends upon many variables such as the change in reflectivity of a material with temperature, the creation of a vapor above the molten metal, and the change in surface roughness and joint geometry after melting. Fortunately for practicing the method of the invention, the contribution of each of these variables to the change in slope does not have to be determined, because their total contribution, represented by curve 54, can be readily determined by exposing a sample of the particular weld joint to a laser beam of desired power output.

Assuming that all the output power from laser 16 is either absorbed in the material by the welding process or reflected and scattered, then:

$$P_D = P_T(1-A)\eta$$

where:
 $P_D$ = power received by the wattmeter
 $P_T$ = the total incident power,
 A = the apparent absorption coefficient, A + R = 1, where
  R = the total reflection and scattering coefficient, and
 n = the fraction of the reflected and scattered power intercepted by the wattmeter.

As shown in the above equation, the power received by the wattmeter is a function of $P_T$, A, and $\eta$. If the wattmeter is positioned to receive all the reflected and scattered power, then $\eta = 1$ and the power absorbed, $P_TA$, equals the total power minus the power received by the wattmeter.

It is not necessary that the wattmeter receive all the reflected power in order for it to provide a suitable control signal. However, the wattmeter should receive a representative sample of the reflected and scattered power and not a varying percentage as the beam is deflected by irregularities in the joint. In other words, $\eta$ should be substantially constant. This problem is readily overcome by proper placement of the wattmeter close to the weld joint, or by the use of additional wattmeters to measure the scattered radiation not intercepted by a single wattmeter.

If $P_T$ is kept constant (as in the first embodiment, FIG. 2) or controlled in a known manner (as in the second embodiment, FIG. 3), then the reflected power, $P_TR$, is simply an inverse indication of the power absorbed, $P_TA$. Therefore, reflected power can be used as an indicator to control the power absorbed during welding.

According to the first embodiment, the speed of the skate motor 14 moving the weld specimen 2 is controlled as an inverse function of the reflected power. If the reflected power decreases, then more power is being absorbed by the weld and the speed of the motor is increased to move the weld faster under the beam and provide more uniform heat input per unit length of weld. If the reflected power increases, then less power is being absorbed and the speed of the motor is decreased to equalize the heat input per unit length of weld.

According to the second embodiment, the power of the incident beam 18 ($P_T$) is controlled as a direct function of the power reflected ($P_T R$) while the speed of the weld specimen is held constant. When reflected power decreases, the total power of the incident beam is also decreased so that the power absorbed ($P_T A$) during welding is held constant. Conversely, when reflected power increases, the power of the incident beam is increased to make up for the increased loss in power by reflection.

The actual power required for a particular weld depends on many factors such as the depth of the weld, the material being welded, the speed of the skate motor, chill plates used, etc.

As is usual with automated welding, a weld schedule is experimentally established by subjecting desired weld configurations to various welding conditions and then examining the joints to determine the optimum weld conditions for obtaining a sound weld joint. Once a weld schedule is obtained, satisfactory production welds can be obtained by following the established weld schedule.

The dashed line 58 in FIG. 4 shows the reflected power established experimentally for making a butt weld in a 0.032 inch thick aluminum sheet. Rather than continuing the downward slope of curve 54, movement of the weld specimen 2 is begun when the reflected power equals 60 watts (for this particular joint design). For illustration, line 58 is shown straight. However, there may be some ripple or oscillation in reflected power depending upon the overall response of the system. Beginning of weld travel 60 can be automatically initiated by a signal from the wattmeter 24 to the power supply for motor 14. The previously mentioned set points (differential amplifier set point 34 in FIG. 2, the laser power set point 40 and velocity control set point 42) are experimentally determined to obtain a suitable weld schedule for different weld configurations.

Other automatic weld control devices and techniques can be used in conjunction with the present invention. For example, in some cases, such as welding thick plate, it may be desirable to incorporate an infrared sensor on the backside of the weld joint to assist in controlling and monitoring the depth of weld penetration. The input from the infrared sensors can be used to override the input from the wattmeter or can be used to modify the input from the wattmeter.

Additionally, the control of the weld speed and incident power need not be a linear function of the reflected power. For certain joint configurations, the control can be based upon the ratio of reflected power to total power. Electrical circuitry is available for modifying the wattmeter output as necessary to provide suitable functions of the reflected power to automatically control laser welding.

Further, feedback from the wattmeter can be used to simultaneously control both the laser power and the speed of the skate motor utilizing weighing factors which are experimentally determined to provide satisfactory welds.

Numerous variations and modifications may be made without departing from the present invention. Accordingly, it should be clearly understood that the form of the present invention described above and shown in the accompanying drawings is illustrative only and is not intended to limit the scope of the present invention.

What is claimed is:

1. A method of heating a surface by radiation comprising the steps of:
   (a) projecting a beam of radiation upon a portion of the surface to be heated;
   (b) measuring the said radiation reflected by the surface to be heated;
   (c) moving the surface to be heated relative to said beam of radiation; and
   (d) controlling the radiation projected per unit area of the surface being heated as a function of the measured radiation reflected by the surface to be heated.

2. The method as claimed in claim 1, wherein said function is a direct function of the ratio of the radiation reflected to the radiation projected.

3. The method as claimed in claim 1, wherein said step of controlling radiation per unit area comprises controlling the movement of said surface relative to said beam of radiation as a function of the measured amount of radiation reflected by the surface.

4. The method as claimed in claim 1, wherein said step of controlling the radiation per unit area comprises controlling the amount of radiation projected as a function of the measured amount of radiation reflected by the surface.

5. The method as claimed in claim 1, wherein said beam of radiation comprises a beam of light from a laser.

6. The method as claimed in claim 5, wherein said step of measuring the reflected radiation comprises placing a light-measuring wattmeter pick up in the path of the reflected radiation and measuring the output of said wattmeter.

7. A method of controlling welding with laser radiation comprising:
   (a) projecting a beam of laser radiation upon a portion of the surface to be welded;
   (b) measuring the amount of said radiation reflected by the surface to be heated;
   (c) moving the surface to be heated relative to said beam of laser radiation; and
   (d) controlling the rate of radiation projected per unit area of the weld joint by controlling the velocity of said surface relative to said beam of laser radiation as a function of the measured amount of laser radiation reflected by the surface.

8. A method of welding with laser radiation comprising:
   (a) projecting a beam of laser radiation upon a portion of the surface to be welded;
   (b) measuring the amount of said radiation reflected by the surface to be heated;
   (c) moving the surface to be heated relative to said beam of laser radiation; and
   (d) controlling the rate of radiation projected per unit area of the weld joint by controlling the amount of laser radiation projected as a function of the measured amount of laser radiation reflected by the surface.

9. An apparatus for heating a surface by radiation comprising:
   means for projecting a beam of radiation upon a portion of the surface to be heated;
   means for measuring the amount of said radiation reflected by the surface to be heated, said means for measuring being positioned in the path of the reflected radiation;

means for moving the surface to be heated relative to said beam of radiation; and means for controlling the rate of radiation projected per unit area of the surface being heated as a function of the amount of radiation reflected by the surface to be heated, said control means being coupled to said measuring means.

10. The apparatus as claimed in claim 9, wherein said means for projecting a beam of radiation comprises a laser.

11. The apparatus as claimed in claim 9, wherein said means for measuring comprises the pick up of a light-measuring wattmeter placed in the path of the reflected beam.

12. The apparatus as claimed in claim 9, wherein said means for measuring comprises a beam splitter positioned in the path of the reflected beam and a light-measuring wattmeter, said beam splitter diverting a portion of the reflected beam into said wattmeter.

13. The apparatus as claimed in claim 9, wherein said means for moving comprises a support for carrying the surface to be heated, a gear box coupled to said support for moving said support, and a variable speed motor for running said gear box; and wherein said means for controlling comprises a feedback generator coupled to said motor, and a differential amplifier, said differential amplifier receiving its input from said feedback generator and from said wattmeter and providing its output to run said motor.

14. The apparatus as claimed in claim 9, wherein said means for controlling comprises a constant current power control coupled to said means for projecting a beam and an amplifier receiving its input from said wattmeter and providing its output to said constant current power control.

15. An apparatus for welding with laser radiation comprising:
- a laser for projecting a beam of light on the surface to be welded;
- a meter for measuring the amount of said radiation reflected by the surface being welded, said meter being positioned in the path of the reflected radiation;
- a support for carrying the surface to be welded;
- a variable speed motor coupled to said support for moving said support;
- a feedback generator receiving its input from said motor;
- a differential amplifier receiving its input from said feedback generator and from said wattmeter, and providing its output to run said motor, whereby the rate of light projected per unit area of the surface to be welded as controlled as a function of the amount of light reflected by the surface to be welded.

* * * * *